(12) United States Patent
Kershaw

(10) Patent No.: US 6,893,032 B2
(45) Date of Patent: May 17, 2005

(54) CASTER SUPPORTED MOBILE TRAY

(76) Inventor: Thomas R. Kershaw, 5626 Riverside Dr., Cape Coral, FL (US) 33904

( * ) Notice: Subject to any disclaimer, the term of this patent is extended or adjusted under 35 U.S.C. 154(b) by 63 days.

(21) Appl. No.: 10/352,746

(22) Filed: Jan. 29, 2003

(65) Prior Publication Data

US 2004/0145139 A1 Jul. 29, 2004

(51) Int. Cl.⁷ ................................................ B62B 3/04
(52) U.S. Cl. .................................. 280/79.5; 280/47.11
(58) Field of Search ............................. 280/79.11, 79.2, 280/79.5, 32.6, 47.11; 248/129; 47/39; 220/737, 628

(56) References Cited

U.S. PATENT DOCUMENTS

| 2,707,351 | A | * | 5/1955 | Walker | 47/39 |
|---|---|---|---|---|---|
| 5,110,147 | A | * | 5/1992 | Gershman | 280/79.5 |
| 5,209,013 | A | * | 5/1993 | Sellers | 47/71 |
| 5,309,670 | A | * | 5/1994 | Bates | 47/71 |
| 5,445,396 | A | * | 8/1995 | Sebor | 280/33.998 |
| 5,472,220 | A | * | 12/1995 | Stephan | 280/79.5 |
| 5,819,469 | A | * | 10/1998 | Hsu | 47/39 |
| 6,209,891 | B1 | * | 4/2001 | Herrmann | 280/32.6 |
| D461,614 | S | * | 8/2002 | Liu | D34/23 |
| 6,488,293 | B1 | * | 12/2002 | Mitchell et al. | 280/47.34 |

* cited by examiner

Primary Examiner—Christopher P. Ellis
Assistant Examiner—Brian Swenson

(57) ABSTRACT

A multi-purpose wheeled carrier that includes various surfaces, recesses and unique features for providing alternative methods of containing, sorting and transporting random materials of various sizes, bulk and weight. The base of the carrier has a shallow upstanding circular wall large enough to accept a container of the 5 gallon size and a multiple of smaller containers, the base has other provisions for the reception of smaller parts and or tools. Recesses at other levels similarly have recesses again for accepting smaller items. Holes and slots provided at various heights allow for bulkier items to be fastened to the carrier by way of fasteners.

6 Claims, 1 Drawing Sheet

CASTER SUPPORTED MOBILE TRAY

BACKGROUND OF THE INVENTION

The invention is directed to a caster supported multi-level mobile tray or base that assists in easier movement of heavy pails larger materials while likewise adaptable as a multi-purpose carrier with organizer features for tools, parts and other miscellaneous items.

Mobile trays, caddies and carriers are known in various environments such as workshops, cleaning areas or work areas.

U.S. Pat. No. 4,861,050 represents such a carrier. It is called a valet for a craftsman. The valet has a wheeled support base including a pedestal which is mounted on a supporting base for supporting a bucket. The valet is also provided with storage compartments. The device generally consists of a base having an upstanding wall and a pedestal in the center thereof. The pedestal further has a horizontal shelf with another upstanding wall which can receive and support a bucket of paint, for example. It is not specifically intended for adaptation or for securing an additional platforms or materials at dedicated levels or location.

U.S. Pat. No. 5,390,944 illustrates an implement carrier and organizer including a hollow body with a top closure from which are suspended upwardly opening wells for storage of tools inverted. This carrier is not designed to carry any pails or buckets, nor does it specifically provide for securing additional platforms or materials.

U.S. Pat. No. 5,472,220 discloses a carrier or dolly with an upwardly extending wall forming a receptacle that conforms to the size of a standard five gallon bucket that can be clamped to the upstanding wall of the carrier to prevent tipping. There are no provisions to receive and carry any other working implements, nor are there specific proisions for securing or attaching additional platforms or materials.

U.S. Pat. No. 5,806,867 discloses a square wheeled trolley having a resilient engaging wall for retaining a standardized sized bucket. The outer corners of the squared design around the round bucket are intended to store useful and desired implements therein.

U.S. Pat. No. 6,209,891 reveals a square movable work seat cart that can carry a bucket which bucket can be converted to a seat. The assembly includes a unitary body member having a receptacle for a bucket and a partitioned equipment retainer tray surrounding the bucket. A peripheral skirt surrounds the equipment tray and swivel wheel assemblies are positioned between the peripheral skirt and the bucket assembly.

U.S. Pat. No. 6,419,246 shows a dolly facilitating the transport of a cylindrical bucket or can. The dolly includes a wheel base comprising a frame having a plurality of elongated members which are joined together in a planar spoke-like arrangement so that the end portions of the members are directed generally outwardly of a center. The dolly has no provisions for carrying or storing any other items such as tools and-other items used in performing certain tasks.

U.S. Pat. No. 6,135,467 discloses a bucket stand having caster wheels there under. The stand may be clamped to a bucket to form a movable unit. The overall unit is collapsible for easy storage. The unit further includes a plurality of peripheral receptacles for further storage utility.

SUMMARY AND OBJECTS OF THE INVENTION

The invention resides in a multi-purpose wheeled carrier with a variety of arrangements for containing and transporting random materials from one site to another. The carrier includes a multiple of surface levels with unique features for providing alternative methods of sorting, storing, containing and transporting various tools and materials.

BRIEF DESCRIPTION OF THE DRAWING

The FIGURE is a perspective view of the dolly or wheeled carrier.

DETAILED DESCRIPTION OF THE INVENTION

Figure 1:
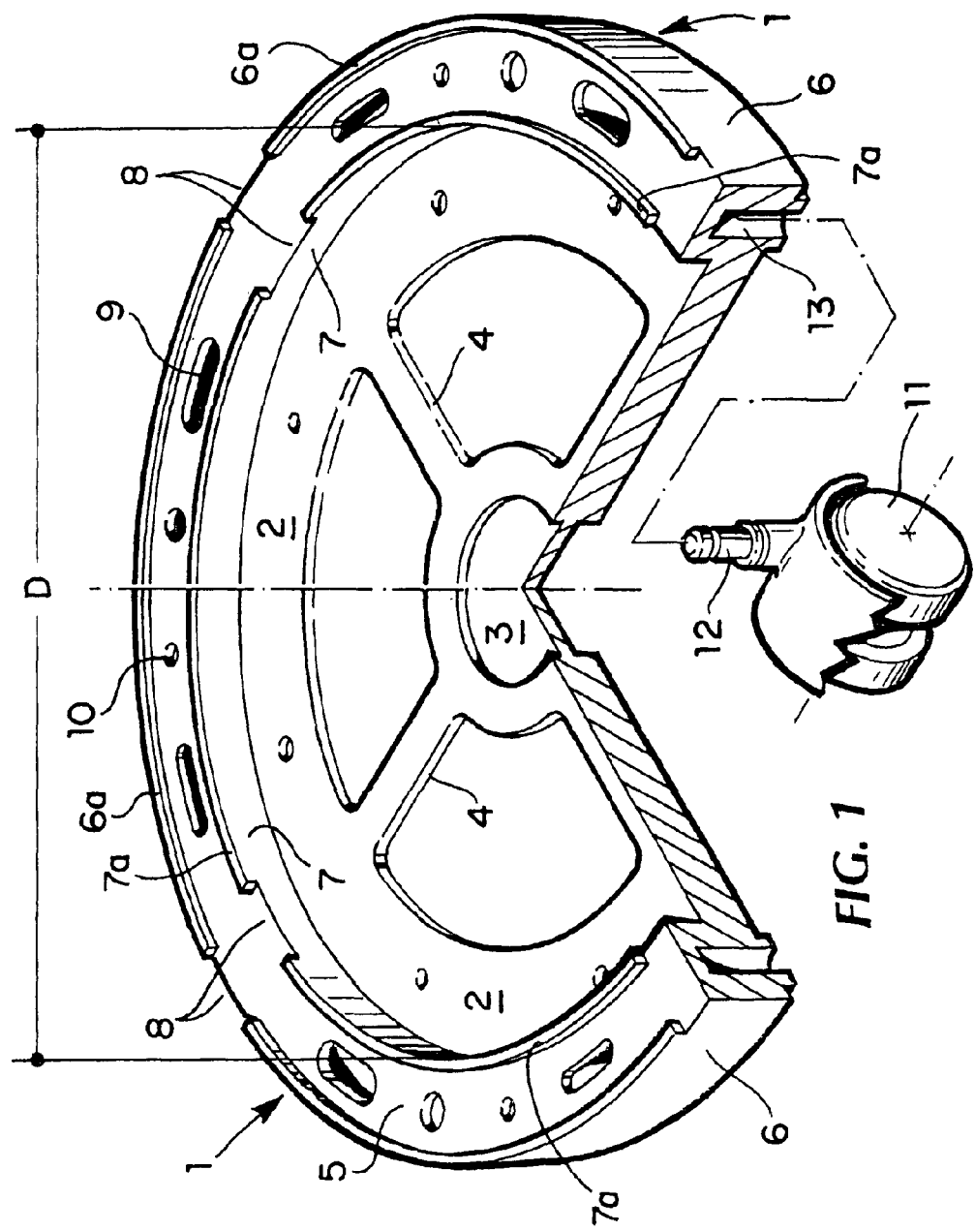

The carrier, overall designated as 1, includes a segmented recess level 2 providing an area for placement, storing components, tools and random items contained within the confines of a limited height surrounding wall 6. This level of the carrier includes an additional recessed circular pocket area 3 provided for isolating smaller items therein/. The bottom support surface 2 may be made of segmented recesses as is indicated by the crosses 4. The segmented recesses may have roughened surfaces to aid in picking items contained therein.

The recessed level of the wheeled carrier indicated by the diameter D also provides an accessible area to accommodate various sized containers, notably, pails, cans or buckets up to 5 gallon size that are retained by a shallow wall 7 which wall can be cleared by a limited lifting of the container.

Holes are provided in the wheeled carrier for attachment of empty containers by way of hardware or other fasteners to allow for an additional capacity for the storage and transport of tools and materials. Likewise, a container may be secured to the carrier by applying an adhesive, such as construction caulk, between the container base perimeter and the provided shallow wall 7.

At an uppermost level the wheeled carrier is provided with an elevated surface 5 formed by the outer wall 6 and the inner wall 7. The elevated surface is semi-enclosed by perimeter ribs 6a and 7a for the isolation and storage of additional smaller items that may benefit from accessibility and ease of fingertip retrieval through rib openings 8 especially provided for that purpose. Also provided at this upper perimeter level are holes 10 and slots 9 permitting an upright placement of hand tools or other items for similar accessibility. The holes 10 and slots 9 of the elevated surface 5 also provide a way for fasteners to secure large containers (such as trash barrels) or platforms (such as plywood sheets or padded materials) to the wheeled carrier to assist in the containment and the movement of more cumbersome loads such as debris, furniture, heavy cartons and household materials.

As is shown in the FIGURE, casters 11 are provided to enable the dolly to be wheeled. The casters 11 have swivel shafts 12 which are inserted in the holes 13 in such a manner so that they can rotate therein.

I claim:

1. A circular carrier having casters thereon adapted to be wheeled on a surface, said carrier having multi-level surfaces, a first surface forming a circular bottom support surface adapted to support a circular container thereon, said bottom support surface is subdivided into recessed segmented pockets for visually sorting certain items, said bottom surface having an upstanding circular wall thereon to prevent said circular container from sliding off, said upstanding wall forming a second wider support surface at a top thereof, said second surface having spaced apart and upstanding perimeter ribs thereon, said second surface having means thereon for storing smaller items thereon, said upstanding ribs having peripheral interruptions therein to be able to slide any of said smaller items from said second surface.

2. The circular carrier of claim 1 including a circular depression in the center of said bottom support surface.

3. The circular carrier of claim 1, wherein said recessed segmented pockets have a roughened surface to aid in picking up items from said surface.

4. The circular carrier of claim 1, wherein the bottom of said carrier has a flat support surface.

5. The circular carrier of claim 1 including holes in said bottom support surface adapted to pass fasteners there through to fasten items to said bottom support surface.

6. The circular carrier of claim 1 including holes and slots in said second support surface there through for fastening extra large items on said second support surface.

* * * * *